(12) United States Patent
St. Laurent et al.

(10) Patent No.: US 11,928,376 B2
(45) Date of Patent: Mar. 12, 2024

(54) RECOMMENDED PRINT JOB DELIVERY PATHS

(71) Applicant: Hewlett-Packard Development Company, L.P., Spring, TX (US)

(72) Inventors: Michael St. Laurent, Kitchener (CA); Rajivkumar Vinodchandra Mistry, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/011,672

(22) PCT Filed: Jul. 31, 2020

(86) PCT No.: PCT/US2020/044644
§ 371 (c)(1),
(2) Date: Dec. 20, 2022

(87) PCT Pub. No.: WO2022/025935
PCT Pub. Date: Feb. 3, 2022

(65) Prior Publication Data
US 2023/0259315 A1  Aug. 17, 2023

(51) Int. Cl.
*G06F 3/12* (2006.01)
(52) U.S. Cl.
CPC ............ *G06F 3/126* (2013.01); *G06F 3/1204* (2013.01)
(58) Field of Classification Search
CPC ...... G06F 3/1204; G06F 3/126; G06F 3/1232; G06F 3/1288
See application file for complete search history.

(56) References Cited

U.S. PATENT DOCUMENTS

| | | | |
|---|---|---|---|
| 8,237,958 B2 | 8/2012 | Emori | |
| 2011/0216351 A1 | 9/2011 | Habaguchi et al. | |
| 2012/0030298 A1 | 2/2012 | Bells et al. | |
| 2012/0127511 A1 | 5/2012 | Evanitsky | |
| 2013/0003111 A1* | 1/2013 | Mitsubori | H04N 1/32651 358/1.15 |
| 2013/0094060 A1 | 4/2013 | Jaudon et al. | |
| 2013/0141760 A1* | 6/2013 | Mori | G06F 3/121 358/1.15 |

(Continued)

FOREIGN PATENT DOCUMENTS

JP  2012-243253 A  12/2012

*Primary Examiner* — John R Wallace
(74) *Attorney, Agent, or Firm* — Michael Dryja (57) ABSTRACT

According to examples, an apparatus may include a processor and a memory on which are stored machine-readable instructions that when executed by the processor, may cause the processor to maintain client presence information that is received from a client and maintain printer presence information that is received from a printer. The client presence information may include a client network property and the printer presence information may include a printer network property. In some examples, the processor may receive print job information for a print job from the client and may determine a recommended print job delivery path for the print job based on the print job information, the client presence information, and the printer presence information. The processor may cause the print job to be routed to the printer based on the recommended print job delivery path.

20 Claims, 4 Drawing Sheets

(56) References Cited

U.S. PATENT DOCUMENTS

| | | |
|---|---|---|
| 2014/0204403 A1 | 7/2014 | Young |
| 2014/0211232 A1* | 7/2014 | Ganesan et al. |
| 2016/0277602 A1* | 9/2016 | Imai ...................... G06F 3/1207 |
| 2016/0283828 A1* | 9/2016 | Osadchyy ........... G06K 15/1823 |
| 2017/0068493 A1 | 3/2017 | Kulkarni et al. |
| 2017/0206039 A1 | 7/2017 | Lee |
| 2017/0269881 A1* | 9/2017 | Naitoh .................. G06F 3/1244 |
| 2021/0081521 A1* | 3/2021 | Deng ...................... G06F 21/31 |

\* cited by examiner

RECOMMENDED PRINT JOB DELIVERY PATHS

BACKGROUND

Client devices may be connected to printers disposed on a computer network. In some examples, a cloud-based service may route print jobs from the client devices to the printers over the computer network.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Client devices, such as personal computers, laptop computers, mobile phones, tablets, and/or the like, may be coupled to printers over networks. A concern associated with coupling client devices to printers over networks may be that users may often be mobile and may move between networks when working or in other situations that may involve use of the printers. The burden of determining whether a network printer is accessible and adjusting a configuration of the client device based on the client device's ability to communicate over the network may be complex and cumbersome.

Disclosed herein are apparatuses, systems, methods, and computer-readable media to implement print job routing. A cloud-based print job delivery system may be implemented for clients and printers, and the apparatus on which the cloud-based service is implemented may consider a range of data from the clients and the printers to dynamically adjust a print job delivery path between the clients and the printers, using both direct communication (e.g., local delivery paths) and indirect communication (cloud-based delivery paths). In some examples, a cloud-based service may receive information from a client based on automatic local discovery of a printer by the client and, by a use of historical information about success and environmental impacts, may enable automatic connection of the printer to provide dynamic routing of a print job with reduced user intervention.

In some examples, an apparatus, which may provide a cloud-based service, may include a processor to maintain client presence information that may be received from a client. The client presence information may include client network properties. The processor may also maintain printer presence information that may be received from a printer. The printer presence information may include printer network properties. In some examples, the processor may receive print job information for a print job from the client and may determine a recommended print job delivery path for the print job based on the print job information, the client presence information, and the printer presence information. In some examples, the processor may cause the print job to be routed to the printer based on the recommended print job delivery path.

Through implementation of the features of the present disclosure, a processor may enable automatic print job routing or re-routing based on both client presence information and printer presence information maintained on a cloud-based service, and may enable users to quickly and efficiently identify and communicate with a printer(s) on a network. In some examples, the apparatuses, systems, methods, and computer-readable media of the present disclosure may allow users who may be mobile and moving between networks when working or in other situations to more efficiently and easily connect to a printer without the burden of determining whether a printer is accessible, and may automatically adjust the configuration of the client based on the client's ability to communicate over a network. As such, the present disclosure may facilitate automation and make more efficient the process of adjusting configurations of the client and/or the printer with which the user may not be familiar, thereby alleviating clients from navigating through a configuration process that may be complex and cumbersome to print a print job.

Figure 1:
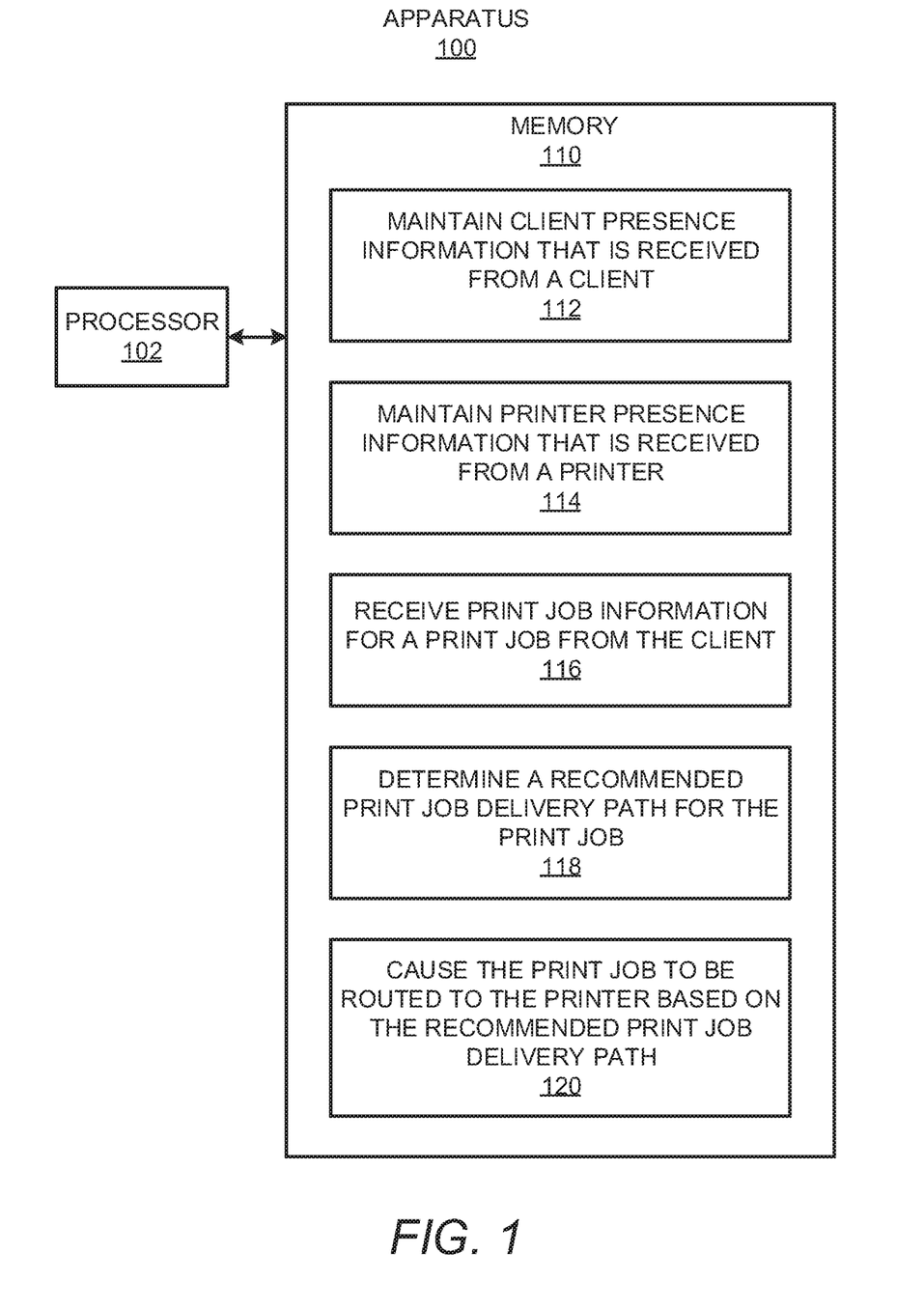
FIG. 1 depicts a block diagram of an example apparatus that may determine a recommended print job delivery path for a print job.
Figure 2:
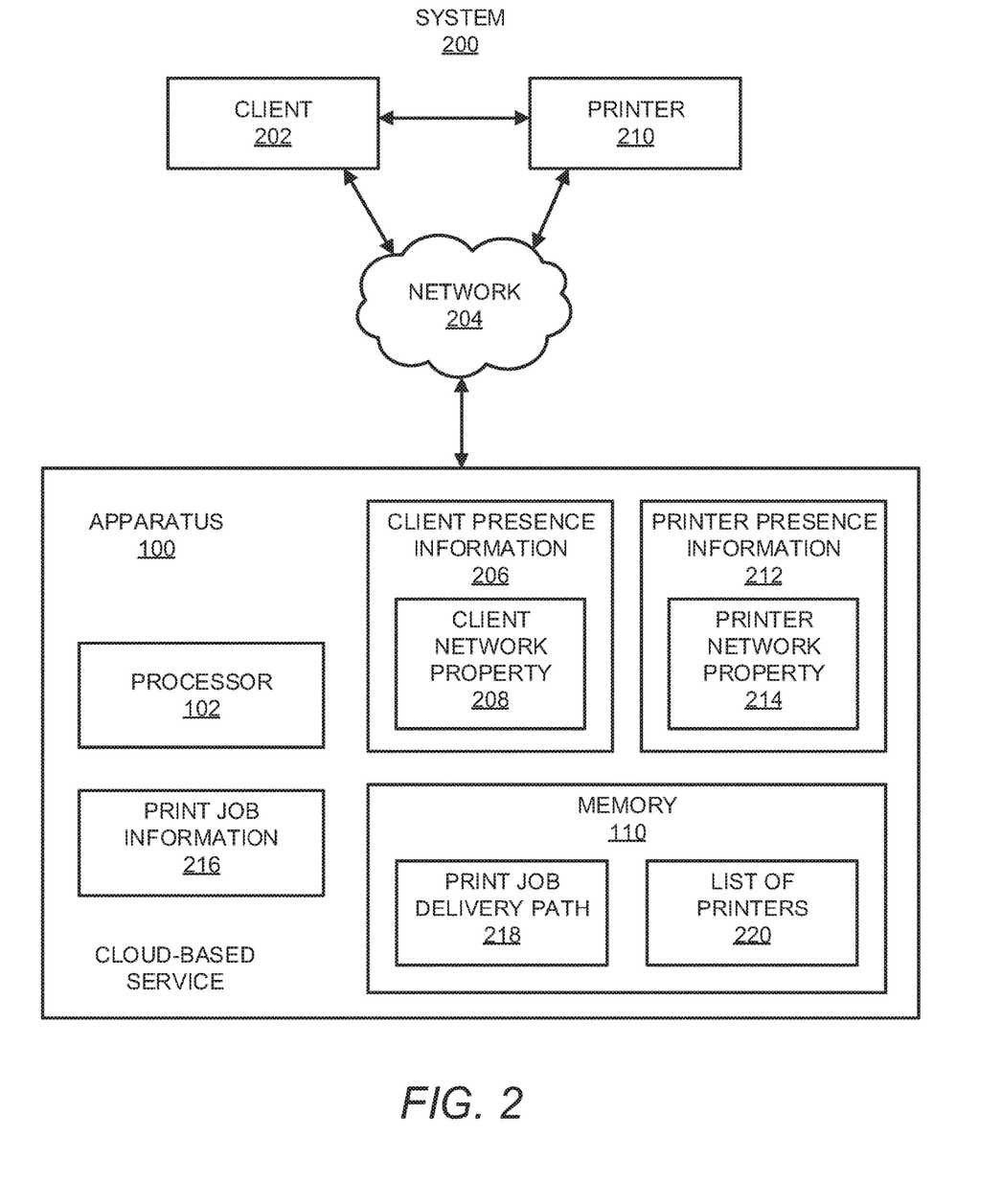
FIG. 2 shows a block diagram of an example system within which the example apparatus depicted in FIG. 1 may be implemented.

Reference is first made to FIGS. 1 and 2. FIG. 1 shows a block diagram of an example apparatus 100 that may determine a recommended print job delivery path for a print job. FIG. 2 shows a block diagram of an example system 200 within which the example apparatus 100 depicted in FIG. 1 may be implemented. It should be understood that the apparatus 100 depicted in FIG. 1 and/or the system 200 depicted in FIG. 2 may include additional features and that some of the features described herein may be removed and/or modified without departing from the scopes of the apparatus 100 and/or the system 200.

The apparatus 100 may provide a cloud-based service. In some examples, the apparatus 100 may include a computing device, such as a server, a node in a network (such as a data center), a personal computer, a network gateway, a network router, an electronic device such as Internet of Things (IoT) device, and/or the like. As shown, the apparatus 100 may include a processor 102 and a non-transitory computer-readable medium, e.g., a memory 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100 and/or system 200. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-120 to determine a recommended print job delivery path and route the print job on the recommended print job delivery path. The instructions 112-120 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-120.

The processor 102 may fetch, decode, and execute the instructions 112 to maintain client presence information 206 that is received from a client 202. In some examples, the client 202 may include a client application, a client interface such as an application programming interface (API), and/or the like, that is executing at a client device and is in communication with the apparatus 100 (e.g., a cloud-based service) over a network 204 to manage print jobs from the client device. In this regard, a user may register the client 202, e.g., the client application, with the apparatus 100 and the client application may periodically or at predetermined times/schedules report a status of the client 202 to the apparatus 100. In this regard, the information reported to the apparatus 100 may be client presence information 206. The processor 102 may maintain the client presence information 206 by storing and updating the client presence information 206 at the apparatus 100. For instance, the processor 102 may store a copy of the client presence information 206 on the apparatus 100 and may update the stored client presence information 206 based on the client presence information that is periodically received from the client 202.

The client presence information 206 may include information used to determine a dynamic and real-time connectivity path for a print job. In some examples, the client presence information 206 may include a client network property 208, client capabilities and proximity, user defined conditions, and/or the like. By way of particular example and for purposes of illustration, the client network property 208 may include a cloud connectivity status of the client 202, a preferred print flow of the client 202, a previously successful print job delivery path, a network address of the client 202, a geo-location of the client 202, network performance information of the client 202 (e.g., network bandwidth, load, latency, and/or the like at the client 202), and/or the like. In some examples, the cloud connectivity status of the client 202 may include a current, a historical, and/or a preferred connectivity for the client 202. The network address of the client 202 may include a local area network (LAN) and a wide area network (WAN) Internet protocol (IP) addresses, and/or the like. In some examples, the client presence information 206 may be stored in the memory 110, a database disposed in the apparatus 100 or in communication with the apparatus 100, and/or the like. In some examples, the client capabilities included in the client presence information 206 may include a capability of the client interface, such as connection capabilities, image rendering capabilities, and/or the like. The proximity included in the client presence information 206 may include information on physical proximity of the client 202 to the printer 210, other printers, and/or the like. In some examples, user defined conditions may include user defined preferences, locations, and/or the like.

The processor 102 may fetch, decode, and execute the instructions 114 to maintain printer presence information 212 that is received from a printer 210. The printer 210 may be registered with the apparatus 100, for instance at a cloud-based service provided by the apparatus 100, and the printer 210 may periodically or at predetermined times/schedules report a status of the printer 210 to the apparatus 100. In some examples, the information reported to the apparatus 100 may be printer presence information 212. The processor 102 may maintain the printer presence information 212 by storing and updating the printer presence information 212 at the apparatus 100. For instance, the processor 102 may store a copy of the printer presence information 206 on the apparatus 100 and may update the stored printer presence information 206 based on the printer presence information that is periodically received from the printer 210.

The printer presence information 212 may include information used to determine a dynamic and real-time connectivity path for a print job. In some examples, the printer presence information 212 may include a printer network property 214, printer capabilities and proximity, user defined conditions, and/or the like. By way of particular example and for purposes of illustration, the printer network property 214 may include a cloud connectivity status of the printer 210, a printer state, a preferred print flow of the printer 210, a previously successful print job delivery path, a network address of the printer 210, a gen-location of the printer 210, network performance information of the printer 210 (e.g., network bandwidth, latency, and/or the like at the printer 210), and/or the like. In some examples, the cloud connectivity status of the printer 210 may include a current connectivity status as well as historical or preferred connectivity statuses associated with the printer 210. The network address of the printer 210 may include a local area network (LAN), a wide area network (WAN) internet protocol (IP) addresses, and/or the like. In some examples, the printer presence information 212 may be stored in the memory 110, a database disposed in the apparatus 100 or in communication with the apparatus 100, and/or the like. In some examples, the printer capabilities included in the printer presence information 212 may include a capability of the printer 210, such as color printing capability, duplex printing capability, paper sizes, and/or the like. The proximity included in the printer presence information 212 may include information on physical proximity of the printer 210 to the client 202, to other printers, and/or the like. In some examples, user defined conditions may include user defined preferences, locations, and/or the like.

The processor 102 may fetch, decode, and execute the instructions 116 to receive print job information 216 for a print job from the client 202. In some examples, the print job information 216 for the print job may include a characteristic of the print job, a current network characteristic of the client 202, a current geo-location of the client 202, current connectivity information associated with a stored printer, and/or the like. By way of particular example, the connectivity information associated with a stored printer may include connectivity information associated with printers that the client 202 has previously connected to, printers defined as preferred printers, and/or the like. In this regard, the client 202 may ping such a stored printer(s), and may send connectivity information to the apparatus 100 for that printer(s) based on the received information from the printer (s).

The processor 102 may fetch, decode, and execute the instructions 118 to determine a recommended print job delivery path 218 for the print job based on the print job information 216, the client presence information 206, and the printer presence information 212. In some examples, the processor 102 may consider the print job information 216 together with the presence information from both the client 202 and the printer 210 to determine an optimal or a preferred path, based on connectivity, optimal performance, proximity, network/printer capabilities and performance, historical preferences, historical successful outcomes, and/or the like.

In this regard, the processor 102 may determine a list 220 of a plurality of printers for the print job information 216 and may determine a ranking of the plurality of printers in the list 220 of printers. In some examples, the processor 102 may filter the plurality of printers in the ranked list 220 of printers based on a capability of each of the plurality of printers, such as a print capability, and may determine a filtered ranking of the plurality of printers. By way of particular example, the capabilities of the printers by which the processor 102 may rank and filter the list 220 of printers may include whether the printer 210 is a color printer, whether the printer 210 supports duplex printing, and/or the like. In some examples, the list 220 of printers may be filtered based on other characteristics of the printer 210, the client 202, and/or the print job information 216, such as historical preferences, historical successes, and/or the like. The processor 102 may determine the recommended print job delivery path 218 based on the filtered ranking of the plurality of printers in the list 220 of printers.

The processor 102 may fetch, decode, and execute the instructions 120 to cause the print job to be routed to the printer 210 based on the recommended print job delivery path 218. In some examples, the processor 102 may send the recommended print job delivery path 218 to cause the client 202 to directly connect to the printer 210 or to send the print job to the printer 210 over the recommended print job delivery path 218.

By way of particular example and for purposes of illustration, the client 202 may initiate automatic local discovery for a local printer, such as the printer 210 depicted in FIG. 2, that is located in the vicinity of the client 202. For instance, the local printer may be a printer that is disposed on the same local network as the client 202. In some examples, the client 202 may send information obtained from the local printer to the apparatus 100 as the client presence information 206. The processor 102 may use the local discovery information, historical information regarding successful connections to the local printer, and/or other environmental impacts such as network capabilities and performance information, to determine a recommended print job delivery path 218. By way of particular example, in case the local printer is an unrecognized printer, such as when the client 202 is not configured to print to the local printer, the processor 102 may determine a cloud based path as a recommended print job delivery path 218, in lieu of a direct local connection. In this instance, the processor 102 may automatically route the print job over the network 204 without further input from the client 202, thereby enabling the client 202 to print to the local printer, without separately configuring the client 202 to print to the local printer.

In some examples, the processor 102 may determine a first recommended print job delivery path and a second recommended print job delivery path that is different than the first recommended print job delivery path. By way of particular example and for purposes of illustration, the first recommended print job delivery path may be a local delivery path between the client 202 and the printer 210, such as a local connection to the printer 210, and the second recommended print job delivery path may be a cloud-based delivery path that is routed through the network 204 to the printer 210. In some examples, the processor 102 may provide both recommended print job delivery paths to the client 202 for selection at the client 202, for instance, automatically by the client 202 or by user selection at the client 202.

In some examples, the first recommended print job delivery path, e.g., the local delivery path, may be a direct delivery path to the printer 210 over a local network, a wired or wireless peer-to-peer connection over a local network, a wireless peer-to-peer connection over a personal area network, and/or the like. By way of particular example and for purposes of illustration, the local delivery path may be implemented via LAN, Wi-Fi Direct, Bluetooth, and/or the like. In some examples, the first recommended print job delivery path, e.g., the local delivery path, may be a preferred connection path in situations where the client 202 is physically in the vicinity of the printer 210. In this instance, the client 202 may attempt to route the print job using the first recommended print job delivery path received from the apparatus 100. In some examples, in a case where the client 202 is unable to connect to the printer 210 locally using the first recommended print job delivery path, the client 202 may use the second recommended print job delivery path, e.g., the cloud-based delivery path. In some examples, the processor 102 may route the print job using the second recommended print job delivery path, e.g., the over the network 204, based on a determination that use of the first recommended print job deliver path has failed.

In some examples, in response to the recommended print job delivery path 218 for the print job being sent to the client 202, the processor 102 may receive a request from the client 202 to re-route the print job. By way of particular example and for purposes of illustration, the client 202 may request that the print job be re-routed based on a change in a connectivity status with the printer 210 over the recommended print job delivery path 218, a selection by the user for a different print job delivery path, and/or the like. For instance, the client 202 may attempt to connect to the printer 210 via a direct connection using the first recommended print job delivery path received from the apparatus 100 and/or may attempt routing the print job using the second recommended print job delivery path over the network 204. In this instance, in case the connection attempts to the printer 210 are unsuccessful, the client 202 may request that the processor 102 re-route the print job. In this regard, the processor 102 may determine a re-routed print job delivery path over a different path, for instance, over a different path over the network 204.

Although a single client 202 and a single printer 210 are depicted as providing presence information to the apparatus 100, it should be understood that a plurality of clients 202 and a plurality of printers 210 may provide presence information to the apparatus 100 without departing from scopes of the apparatus 100 and/or the system 200. For instance, a plurality of clients 202 and a plurality of printers 210 may be registered with the apparatus 100 and implemented to periodically send performance information to the apparatus 100. In this regard, the apparatus 100 may maintain a plurality of client presence information 206 and printer presence information 212.

In some examples, a plurality of clients 202 may crowd source geo-discovery of printers 210, for instance, in situations where a printer 210 is not able to report geo-location information to the apparatus 100. By way of particular example, the plurality of clients 202 may regularly ping the plurality of printers 210 for network performance information, for instance to update the respective printer presence information 212. In this regard, the processor 102 may determine geo-locations of the printers 210 based on the periodically received network performance information for the printers 210 from the plurality of clients 202. In some examples, the processor 102 may use LAN/WAN IP addresses to make a proximity assessment for the printers 210.

Figure 3:
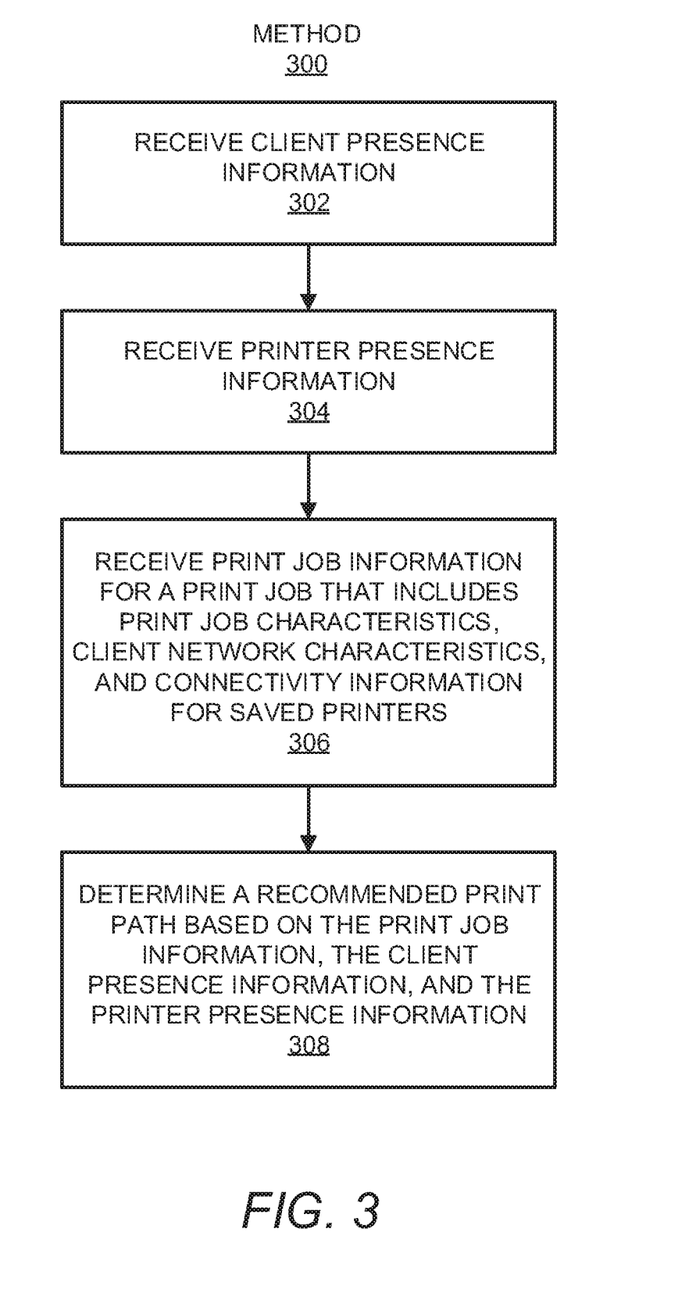
FIG. 3 shows a flow diagram of an example method for determining a recommended print path based on print job information, client presence information, and printer presence information.

Various manners in which the processor 102 may operate are discussed in greater detail with respect to the method 300 depicted in FIG. 3. FIG. 3 depicts a flow diagram of an example method 300 for determining a recommended print path, such as the print job delivery path 218 as depicted in FIG. 2, based on print job information 216, client presence information 206, and printer presence information 212. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may receive client presence information 206 from a client 202. The client presence information 206 may include a client network property for the client 202. The client 202 may be registered with a cloud-based service, which the apparatus 100 may provide, and may periodically, or at predetermined times/schedules, send the client presence information 206 to the apparatus 100 via the cloud-based service. The processor 102 may maintain the client presence information 206 at the apparatus 100.

At block 304, the processor 102 may receive printer presence information 212 from a printer 210. The printer presence information 212 may include a printer network property for the printer 210. The printer 210 may be registered with the apparatus 100 via the cloud-based service and may periodically, or at predetermined times/schedules, send the printer presence information 212 to the apparatus 100. The processor 102 may maintain the printer presence information 212 at the apparatus 100.

In some examples, the client network property 208 and/or the printer network property 214 may include a cloud connectivity status, a preferred print flow associated with the printer 210 and/or the client 202, a previously successful print job delivery path, a network address, a geo-location, network performance information, and/or the like.

At block 306, the processor 102 may receive print job information 216 for a print job from the client 202. The print job information 216 may include print job characteristics, client network characteristics, connectivity information for saved printers, and/or the like.

At block 308, the processor 102 may determine a recommended print path, such as the print job delivery path 218 as depicted in FIG. 2, based on the print job information 216, the client presence information 206, and the printer presence information 212. The recommended print path may include a direct path to the printer 210, a cloud-based path to the printer 210, and/or the like.

In some examples, the processor 102 may determine a list 220 of a plurality of printers for the print job information 216. The processor 102 may determine a ranking of the plurality of printers in the list 220 and may filter the plurality of printers in the ranking based on a print capability of each of the plurality of printers to determine a filtered ranking of the plurality of printers. In this regard, the processor 102 may determine the recommended print job delivery path 218 based on the filtered ranking of the plurality of printers.

In some examples, the processor 102 may, in response to the recommended print job delivery path 218 for the print job, receive a request from the client 202 to re-route the print job. By way of particular example and for purposes of illustration, the client 202 may request re-routing of the print job when connection over the recommended print job delivery path 218 is unsuccessful. In some examples, the processor 102 may determine a re-routed print path based on the request from the client 202. By way of particular example, the previously sent recommended print job delivery path 218 may be for a direct, local connection to the printer 210 and the re-routed print path may be for an over a cloud-based connection to the printer 210. The processor 102 may re-route the print job to the printer 210 over the re-routed print path.

In some examples, the processor 102 may periodically or at predetermined time/schedules receive network performance information for the printer 210 from a plurality of clients, such as the client 202 depicted in FIG. 2. In some examples, the plurality of clients may ping the printer 210 for the network performance information, for instance, the printer presence information 212. The processor 102 may determine a geo-location of the printer 210 based on the periodically received network performance information for the printer 210. In some examples, the processor 102 may assess a proximity of the printer 210 based on received address information, such as the LAN/WAN IP address for the printer 210.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as computer-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 4:
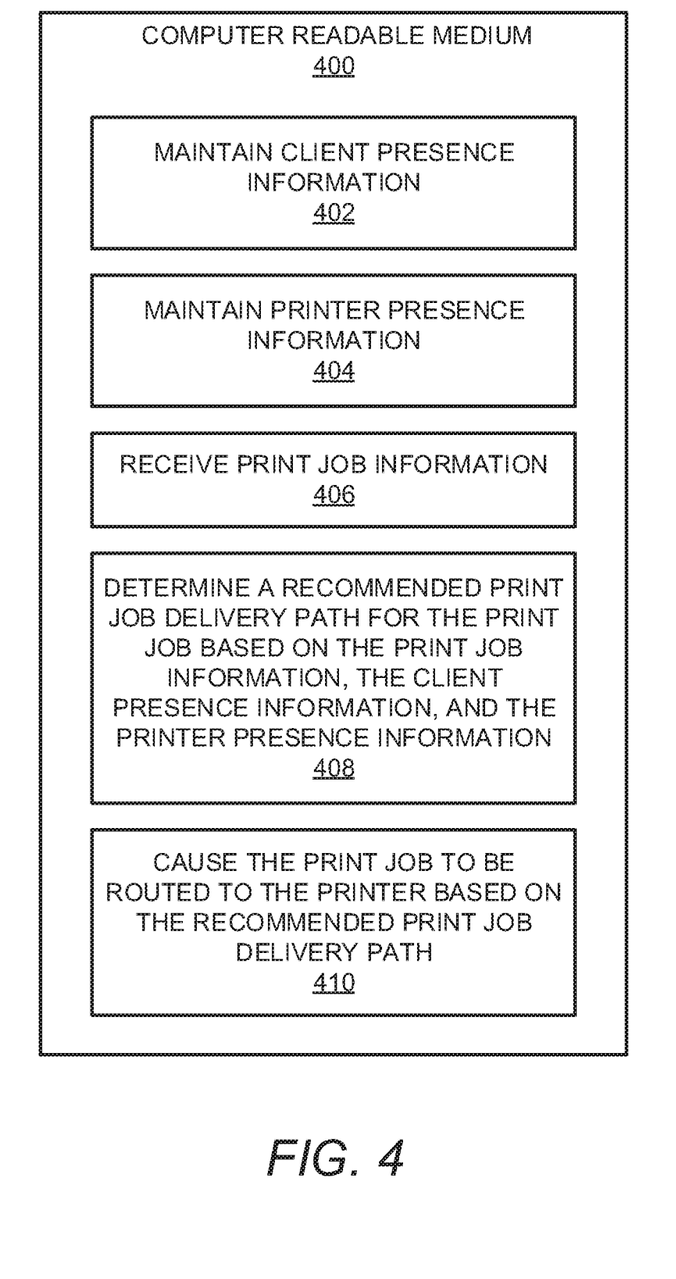
FIG. 4 depicts a block diagram of an example non-transitory computer-readable medium that may have stored thereon computer-readable instructions to maintain client presence information and printer presence information, and determine a recommended print job delivery path based on print job information, the client presence information, and the printer presence information.

Turning now to FIG. 4, there is shown a block diagram of a non-transitory computer-readable medium 400 that may have stored thereon computer-readable instructions to maintain client presence information 206 and printer presence information 212, and determine a recommended print job delivery path 218 based on print job information 216, the client presence information 206, and the printer presence information 212. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium. The term "non-transitory" does not encompass transitory propagating signals.

The computer-readable medium 400 may have stored thereon computer-readable instructions 402-410 that a processor, such as the processor 102 depicted in FIGS. 1-2, may execute. The computer-readable medium 400 may be an electronic, magnetic, optical, or other physical storage device that contains or stores executable instructions. The computer-readable medium 400 may be, for example, Random-Access memory (RAM), an Electrically Erasable Programmable Read-Only Memory (EEPROM), a storage device, an optical disc, or the like.

The processor may fetch, decode, and execute the instructions 402 to maintain, on a cloud-based service, client presence information, such as client presence information 206 depicted in FIG. 2. The cloud-based service may be implemented on an apparatus on a network, such as the apparatus 100 disposed on the network 204. The client presence information 206 may be periodically, or at predetermined times/schedules, received from a client, such as the client 202 depicted in FIG. 2, and may include a client network property, such as the client network property 208 depicted in FIG. 2, and a client location property. The client location property may include geo-location information for the client 202, or the like.

The processor may fetch, decode, and execute the instructions 404 to maintain, on a cloud-based service, printer presence information, such as the printer presence information 212 depicted in FIG. 2. The printer presence information 212 may be periodically, or at predetermined times/schedules, received from a printer, such as the printer 210 depicted in FIG. 2, and may include printer network properties, such as printer network property 214 depicted in FIG. 2, and printer location properties. The printer location property may include geo-location information for the printer 210, or the like.

The processor may fetch, decode, and execute the instructions 406 to receive print job information, such as print job information 216 depicted in FIG. 2, for a print job from the client 202. The processor may fetch, decode, and execute the instructions 408 to determine a recommended print job delivery path, such as the recommended print job delivery path 218 depicted in FIG. 2, for the print job based on the print job information 216, the client presence information 206, and the printer presence information 212. In this regard, the recommended print job delivery path 218 may be a direct local path, a cloud-based path through the cloud-based service, and/or the like.

The processor may fetch, decode, and execute the instructions 410 to cause the print job to be routed to the printer 210 based on the recommended print job delivery path 218. In some examples, the processor may determine a list of a plurality of printers for the print job information 216, such as the list 220 depicted in FIG. 2. The processor may determine a ranking of the plurality of printers in the list 220 and may filter the plurality of printers in the list 220 based on a print capability of each of the plurality of printers to determine a filtered ranking of the plurality of printers. In some examples, the processor may determine the recommended print job delivery path 218 based on the filtered ranking of the plurality of printers.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:
   a processor; and
   a memory on which are stored machine-readable instructions that when executed by the processor, cause the processor to:
   maintain client presence information that is received from a client, the client presence information including a client network property;
   maintain printer presence information that is received from a printer, the printer presence information including a printer network property;
   receive print job information for a print job from the client;
   determine a plurality of recommended print job delivery paths for the print job based on the print job information, the client presence information, and the printer presence information; and
   cause the print job to be routed to the printer based on the recommended print job delivery paths,
   wherein the recommended print job delivery paths include a direct delivery path between the client and the printer and a cloud-based delivery path.

2. The apparatus of claim 1, wherein the instructions cause the processor to:
   periodically receive the client presence information from the client, the client presence information including:
   a cloud connectivity status of the client, a preferred print flow of the client, a previously successful print job delivery path, a network address of the client, a geo-location of the client, and/or network performance information of the client.

3. The apparatus of claim 1, wherein the instructions cause the processor to:
   periodically receive the printer presence information from the client, the printer presence information including:
   a cloud connectivity status of the printer, a printer state, a preferred print flow of the printer, a previously successful print job delivery path, a network address of the printer, a geo-location of the printer, and/or network performance information of the printer.

4. The apparatus of claim 1, wherein the print job information for the print job includes a characteristic of the print job, a current network characteristic of the client, a current geo-location of the client, and/or current connectivity information associated with a stored printer.

5. The apparatus of claim 1, wherein the instructions cause the processor to:
   determine a list of a plurality of printers for the print job information;
   determine a ranking of the plurality of printers in the list;
   filter the plurality of printers in the ranking based on a print capability of each of the plurality of printers to determine a filtered ranking of the plurality of printers; and determine the recommended print job delivery paths based on the filtered ranking of the plurality of printers.

6. The apparatus of claim 1, wherein the instructions cause the processor to cause the print job to be routed to the printer based on the recommended print job delivery paths by:
cause the print job to attempt to be routed to the printer according to the direct delivery path; and
in response to the print job being unable to be routed to the printer according to the direct delivery path, cause the print job to be routed to the printer according to the cloud-based delivery path.

7. The apparatus of claim 1, wherein the instructions cause the processor to:
in response to the recommended print job delivery paths for the print job, receive a request from the client to re-route the print job; and
determine a re-routed print job delivery path, the re-routed print job delivery path being over a network connection; and
send the print job to the printer over the re-routed print job delivery path.

8. The apparatus of claim 1, wherein the instructions cause the processor to:
periodically receive network performance information for the printer from a plurality of clients, the plurality of clients to ping the printer for the network performance information; and
determine a geo-location of the printer based on the periodically received network performance information for the printer.

9. The apparatus of claim 1, wherein the instructions cause the processor to cause the print job to be routed to the printer based on the recommended print job delivery paths by:
providing both the direct delivery path and the cloud-based delivery path to the client for automatic or user selection.

10. A method comprising:
receiving, by a processor, client presence information, the client presence information including a client network property for a client;
receiving, by the processor, printer presence information, the printer presence information including a printer network property for a printer;
receiving, by the processor, print job information for a print job that includes print job characteristics, client network characteristics, and connectivity information for saved printers;
determining, by the processor, a plurality of recommended print paths based on the print job information, the client presence information, and the printer presence information;
causing, by the processor, the print job to be routed to the printer based on the recommended print paths,
wherein the recommended print paths include a direct delivery path between the client and the printer and a cloud-based delivery path.

11. The method of claim 10, further comprising:
periodically receiving and maintaining the client presence information and the printer presence information on a cloud-based service,
wherein the client network property and the printer network property include a cloud connectivity status, a preferred print flow associated with the printer and/or the client, a previously successful print job delivery path, a network address, a geo-location, and/or network performance information.

12. The method of claim 10, further comprising:
determining a list of a plurality of printers for the print job information;
determining a ranking of the plurality of printers in the list;
filtering the plurality of printers in the ranking based on a print capability of each of the plurality of printers to determine a filtered ranking of the plurality of printers; and
determining the recommended print paths based on the filtered ranking of the plurality of printers.

13. The method of claim 10, further comprising:
in response to the recommended print path for the print job, receiving a request from the client to re-route the print job; and
determining a re-routed print path, the re-routed print path being over a network connection; and
routing the print job to the printer over the re-routed print path.

14. The method of claim 10, further comprising:
periodically receiving network performance information for the printer from a plurality of clients, the plurality of clients to ping the printer for the network performance information; and
determining a geo-location of the printer based on the periodically received network performance information for the printer.

15. The method of claim 10, wherein causing the print job to be routed to the printer based on the recommended print paths comprises:
causing the print job to attempt to be routed to the printer according to the direct delivery path; and
in response to the print job being unable to be routed to the printer according to the direct delivery path, causing the print job to be routed to the printer according to the cloud-based delivery path.

16. The method of claim 10, wherein causing the print job to be routed to the printer based on the recommended print paths comprises:
providing both the direct delivery path and the cloud-based delivery path to the client for automatic or user selection.

17. A non-transitory computer readable medium on which is stored machine readable instructions that, when executed by a processor, cause the processor to:
maintain, on a cloud service, client presence information, the client presence information being periodically received from a client and including a client network property and a client location property;
maintain, on the cloud service, printer presence information, the printer presence information being periodically received from a printer and including printer network properties and printer location properties;
receive print job information for a print job from the client;
determine a plurality of recommended print job delivery paths for the print job based on the print job information, the client presence information, and the printer presence information; and
cause the print job to be routed to the printer based on the recommended print job delivery paths,
wherein the recommended print job delivery paths include a direct delivery path between the client and the printer and a cloud-based delivery path.

18. The non-transitory computer-readable medium of claim 17, wherein the instructions cause the processor to:
   determine a list of a plurality of printers for the print job information;
   determine a ranking of the plurality of printers in the list;
   filter the plurality of printers in the list based on a print capability of each of the plurality of printers to determine a filtered ranking of the plurality of printers; and
   determine the recommended print job delivery paths based on the filtered ranking of the plurality of printers.

19. The non-transitory computer-readable medium of claim 17, wherein the instructions cause the processor to cause the print job to be routed to the printer based on the recommended print job delivery paths by:
   providing both the direct delivery path and the cloud-based delivery path to the client for automatic or user selection.

20. The non-transitory computer-readable medium of claim 17, wherein the instructions cause the processor to cause the print job to be routed to the printer based on the recommended print job delivery paths by:
   causing the print job to attempt to be routed to the printer according to the direct delivery path; and
   in response to the print job being unable to be routed to the printer according to the direct delivery path, causing the print job to be routed to the printer according to the cloud-based delivery path.

* * * * *